UNITED STATES PATENT OFFICE.

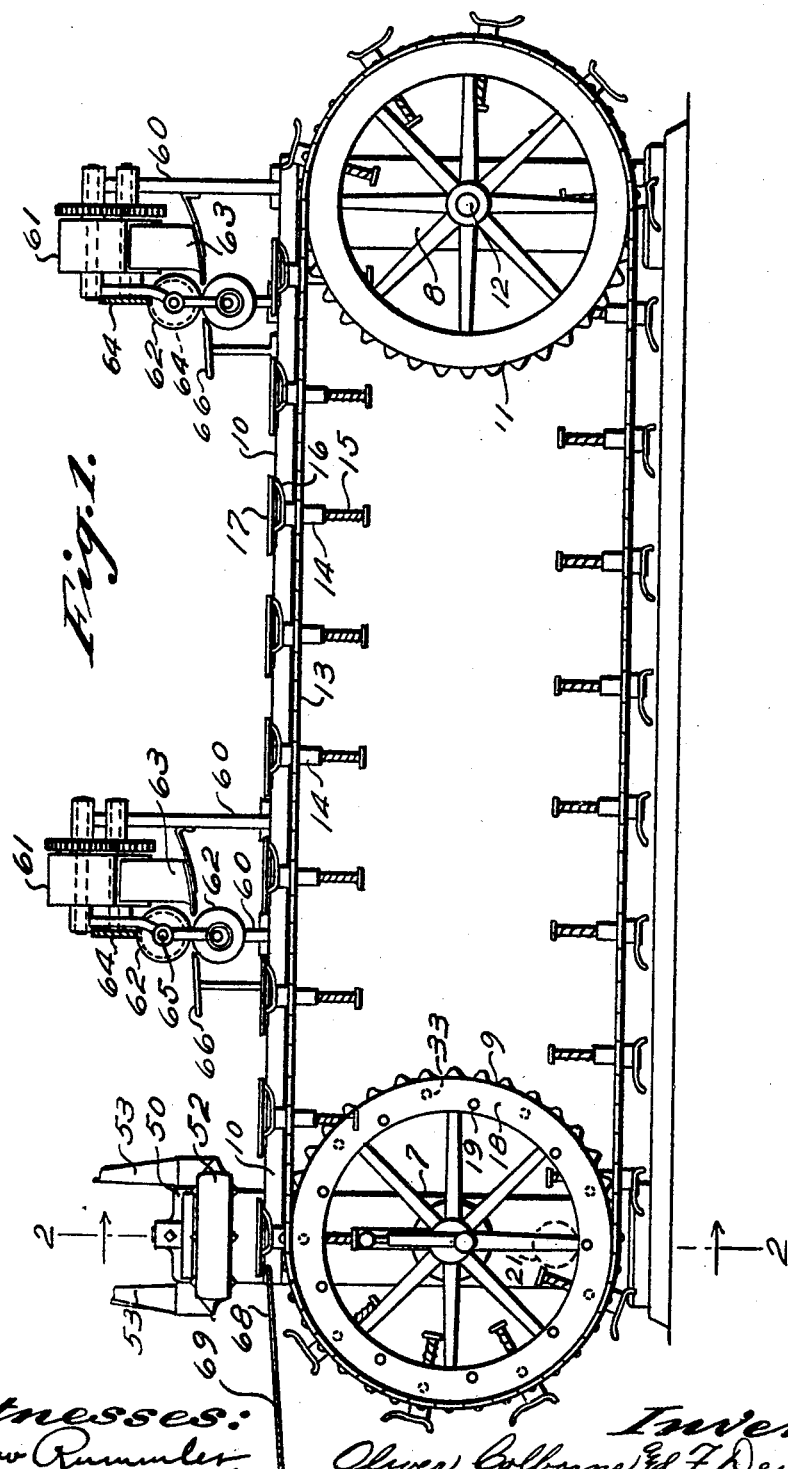

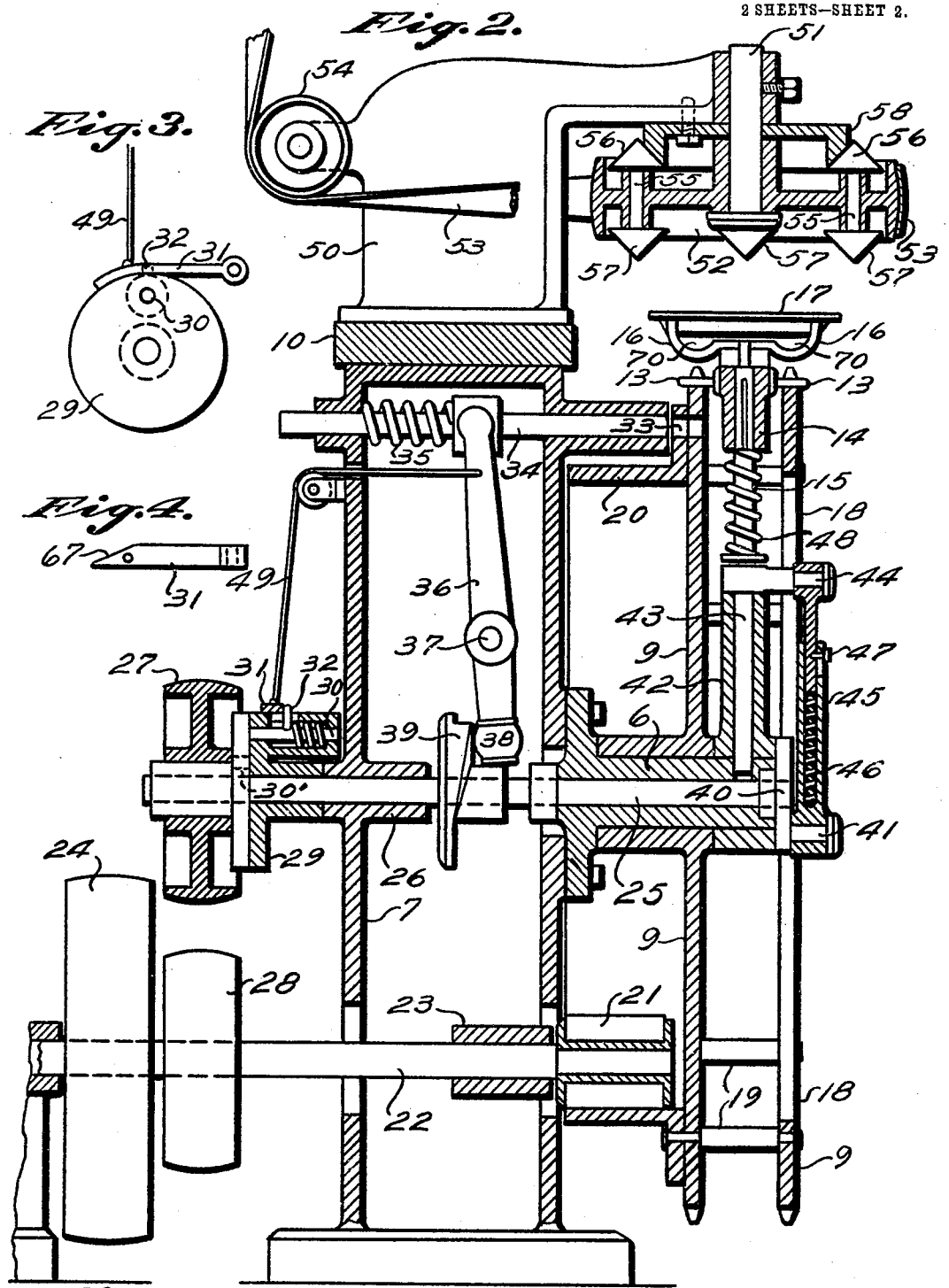

OLIVER COLBORNE AND FRED DEUERLING, OF CHICAGO, ILLINOIS.

PIE-MAKING MACHINE.

No. 795,343.  Specification of Letters Patent.  Patented July 25, 1905.

Application filed December 19, 1904. Serial No. 237,477.

*To all whom it may concern:*

Be it known that we, OLIVER COLBORNE and FRED DEUERLING, citizens of the United States of America, and residents of Chicago, in the county of Cook and State of Illinois, have invented certain new and useful Improvements in Pie-Making Machines, of which the following is a specification.

The main object of our invention is to provide an improved form of pie-making machine having improved means for quickly handling large numbers of pies during the various operations of forming and baking them. We accomplish this object by the device shown in the accompanying drawings, in which—

Figure 1 is a front elevation of a pie-machine constructed according to my invention. Fig. 2 is a transverse section of the same on the line 2 2 of Fig. 1. Figs. 3 and 4 are details of the clutch mechanism which controls the operation of the mechanism for lifting the pie-tins into contact with the trimming devices.

In the construction shown in the drawings the main frame consists of a pair of uprights 7 and 8, rigidly connected together by means of a bed-plate and the table 10. A double sprocket-wheel 9 is journaled on a fixed responding double sprocket-wheel 11 is horizontal stud 6 in the upright 7, and a cormounted on a horizontal shaft 12, in adjustable bearings in the upright 8. The wheels 9 and 11 lie in the same plane and carry an endless conveyer, which consists of a pair of parallel link belts 13, connected to each other at regular intervals by bracket members 14. The members 14 are rigidly connected to the adjacent links of the two belts. Each of the members 14 has a splined connection with a shaft 15, which extends through the member 14 at right angles to the plane of the two belts, and each of the shafts 15 is provided with a head having three supporting-arms 16, disposed at equal angles with each other and arranged for supporting a pie plate or tin 17.

The double sprocket 9 is provided with a hub at only one side, the second flange 18 being secured to the main part of the wheel 9 by means of an annular series of studs 19. The studs 19 are so arranged as to avoid interference with the lower ends of the shafts 15 during the rotation of the wheel 9. The wheel 9 has rigidly secured thereon an annular flange 20, which has internal frictional contact with a friction drive-wheel 21, mounted on a shaft 22, which is journaled in an adjustable bearing 23 on the upright 7. The wheel 21 is continuously driven by power applied to the pulley 24. The stud 6 is hollow and has a shaft 25 extending longitudinally through the same and also journaled at 26 in the upright 7. The shaft 25 is connected to the shaft 22 by means of a belt connecting the pulleys 27 and 28. The pulley 27 is loose on the shaft 25, but is adapted to be intermittently connected therewith by means of a clutch 29, which consists of two plates secured, respectively, to the pulley 27 and the shaft 25. One of said plates is provided with a spring-pressed pin 30, which is normally urged toward the other and adapted to fit an aperture 30' in the other plate. The pin 30 is normally held out of engagement with the opposite clutch member by means of a wedge-shaped detent 31, which is pivotally mounted on the upright 7 and engages the arm 32 on the pin 30.

The sprocket-wheel 9 is provided with an annular series of apertures 33, which are spaced to correspond with the spacing of the members 14, and a pin 34 is slidably mounted in the upright 7 and normally urged toward the wheel 9 by the spring 35. The pin 34 is adapted to fall into one of the apertures 33 when the wheel 9 is in position to bring one of the pie-supporting members 14 into alinement with the trimming mechanism, which is located immediately above the wheel 9 and which will be hereinafter described.

The pin 34 is moved out of engagement with the aperture 33 by means of a lever 36, fulcrumed at 37 and having a roller 38 at its lower end for engaging the cam 39 on the shaft 25. The shaft 25 carries at its front end a face-plate 40, provided with a crank-pin 41. The stud 6 carries in a fixed position at its outer end an upright member 42, within which is slidably mounted a radially-disposed rod 43, carrying a wrist-pin 44 at its upper end, said wrist-pin being connected with the crank-pin 41 by means of a connecting-rod 45, which is preferably formed of two parts telescoping each other and normally urged in an extended position by means of the spring 46. The extension of the connecting-rod is limited by the pin 47. The shaft 15 is normally held in the position shown in the drawings by means of the spring 48. The connecting-rod 45 is adapted, through the rotation of the shaft 25, to raise the rod 43 and force the rod 15, together with the pie-tin, upwardly into contact with the trimming mechanism. The cam 39 is so formed as to withdraw the pin 34 from the aperture 33 through the rotation of the shaft 25 immediately before the wrist-pin 41 returns to its lowest position after having raised the pie-tin into contact with the trimming mechanism. The lever 36 is connected with the detent 31 by means of a cord 49 in such manner that the detent 31 will fall into position for wedging back the pin 30 when the pin 34 is withdrawn to permit the rotation of the wheel 9. This causes the shaft 25 to cease to rotate immediately after the pin 34 has been withdrawn. The cam 39 is, however, so placed upon the shaft 25 that the high point on the cam will have passed the roller 38 before the shaft 25 ceases to rotate. The pin 34 is then urged toward the wheel 9 and is supported by the face thereof until it falls into the next succeeding aperture 33.

The trimming mechanism is mounted in a frame 50, which is secured to the top of the table 10 and extends over the conveyer, as shown in Fig. 2. The stud 51 is mounted in the frame 50 in vertical alinement with the rod 43. A pulley 52 is loosely journaled on the stud 51 and is driven by means of a belt 53, passing over a pair of idlers 54 and connected with a pulley upon some overhead line-shafting. The pulley 52 has journaled therein a plurality of shafts 55, which are equally distant from the stud 51 and parallel therewith. The shafts 55 carry conical friction-rollers 56 at their upper ends and conical trimming-rollers 57 at their lower ends. The friction-rollers 56 work upon a fixed cone 58 and impart to the trimming-rollers 57 a planetary movement about the stud 51.

The crust-rolling devices are two in number and are substantially alike, serving, respectively, for rolling the lower and upper crusts of the pie. The frames 60 of the crust-rolling mechanism are secured to the table 10 and extend over the conveyer in the same manner as does the trimming mechanism. The rolling devices consist of two pairs of rollers disposed at right angles to each other. The rollers 61 are located somewhat above the rollers 62, and the two pairs are connected by an inclined platform 63. Power is applied to the shaft 65 of one of the rollers 62, and said rolls are geared together to rotate in opposite directions. The rolls 61 are geared together in a similar manner and are driven by spiral gears 64 from the shaft 65. The rolls 62 deliver upon a platform 66. One of the rollers in each set is provided with a bearing having an eccentric bushing to provide for the relative adjustment of the rollers. The gears connecting the rollers are specially formed to permit of such adjustment.

The crust-rolling devices are not broadly claimed in this application, but are more fully described and claimed in our copending application filed December 22, 1904, Serial No. 237,987.

The operation of the device shown is as follows: To roll a crust, a globular mass of dough is dropped into the space between the rollers 61, which flattens the dough into a cake of somewhat elliptical form and having a length considerably greater than its breadth. The length of the cake is transverse to the rollers. The cake of dough is delivered to the curved platform 63, which slides it into position for delivery to the second set of rolls 62. The cake of dough is now pushed by the operator into contact with the rolls 62, or, if the platform 63 be properly inclined, the dough will pass said rolls without assistance. The rolls 62 are spaced closer together than the rolls 61 and being disposed at right angles to the rolls 62 tend to elongate the cake in a direction at right angles to the elongation caused by the rolls 61. This reduces the cake to a substantially round layer. The tins are placed upon the conveyer at the right-hand end of Fig. 1, and as they pass the platform 66 an operator places the bottom layer of dough upon the tin. The conveyer then carries the tin toward the left, a second operator places a quantity of fruit or custard upon the lower crust, and a third operator adds the top crust, which is rolled in an exactly similar manner at the second set of rolling mechanism. The friction-roller 21 is continuously driven and slips at times when the conveyer stops. The stopping of the conveyer occurs whenever one of the apertures 33 comes into proper position for receiving the pin 34—that is, when one of the pie-carrying members 14 arrives at a position of alinement with the trimming mechanism. As the pin 34 falls into the hole 33 the detent 31 is lifted, permitting the pin 30 to fall into the aperture 30, when such aperture arrives at the proper position. The shaft 25 then rotates and the action of the connecting-rod 45 forces the pie-tin 17 into contact with the trimming-rollers 57. The upward pressure of the pie-tin insures frictional contact between the friction-rollers and the fixed cone. These roll around the circumference of the pie-tin and cut off all overhanging parts of the crust. The spring 46 in the connecting-rod 45 permits the same to yield so to prevent injury to pie-tins through their contact with the trimming mechanism. The spring 48 returns the shaft 15 to the position shown in the full lines in Fig. 2 as soon as such return is permitted by the return of the wrist-pin 41 to its lowest position. As the wrist-pin nears its lowest position the cam 39 withdraws the pin 34 and at the same time drops the detent 31. The wedge-face 67 of the detent 31 withdraws the pin 30 and friction thereupon causes the instant stopping of the shaft 25. As soon as the pin 34 is released from the aperture 33 the friction-roller 21 compels the continuation of the rotation of the sprocket-wheel 9 and the pie-tin is removed from the conveyer by means of the fingers 68, projecting from the front edge of the delivery-platform 69. These fingers are so spaced as to pass into the spaces 70 between the arms 16 and the pie-tin. Other features of the operation will be readily understood from the drawings and the foregoing description.

It will be seen that numerous details of the construction shown may be altered without departing from the spirit of our invention.

What we claim as our invention, and desire to secure by Letters Patent, is—

1. In a pie-machine, the combination of a frame; a crust-trimming device mounted in said frame; a conveyer adapted to carry a plurality of pie-tins and to deliver the same in succession toward said trimming device; means for automatically moving the pie-tins, out of their normal path of travel with the conveyer, into contact with said trimming device; and mechanism connecting said conveyer and means, and adapted to control their relative operations, substantially as described.

2. In a pie-machine, the combination of a frame; a crust-trimming device mounted in said frame; an intermittently-movable conveyer adapted to carry a plurality of pie-tins and to deliver the same in succession toward said trimming device; means for automatically moving the pie-tins, out of their normal path of travel with the conveyer, into contact with said trimming device; and mechanism connecting said conveyer and means, and adapted to control their relative operations, substantially as described.

3. In a pie-machine, the combination of a frame; a crust-trimming device mounted in said frame to rotate in a horizontal plane; a conveyer mounted in said frame below said trimming device, said conveyer being intermittently movable and adapted to deliver pie-tins in succession to a position of alinement with said trimming mechanism; means for automatically raising the pie-tins into contact with said trimming device, while in alinement therewith; and mechanism connecting said conveyer and means, and adapted to control their relative operations, substantially as described.

4. In a pie-machine, the combination of a frame; a crust-trimming device mounted in said frame to rotate in a horizontal plane; a conveyer mounted in said frame below said trimming device, said conveyer having thereon a series of supports for pie-tins and being intermittently movable to successively bring said supports into positions of alinement with said trimming device, said supports being vertically movable on said conveyer; means for automatically raising each of said supports to bring a tin thereon into contact with said trimming device when in alinement therewith and mechanism connecting said conveyer and means, and adapted to control their relative operations, substantially as described.

5. In a pie-machine, the combination of a frame; a crust-trimming device mounted in said frame to rotate in a horizontal plane; a conveyer mounted in said frame below said trimming device, said conveyer having thereon a series of supports for pie-tins; mechanism for intermittently moving said conveyer and adapted to cause the same to successively stop when said supports come into alinement with said trimming device; means for automatically raising said supports to bring a tin thereon into contact with the trimming device; and clutch mechanism controlling said support-raising mechanism to prevent the same from operating except when the conveyer is stopped, substantially as described.

6. The combination of a horizontally-disposed conveyer having thereon a plurality of supports each adapted to hold a pie-tin in a horizontally-disposed position, and each having a space extending across the same longitudinally of the conveyer and immediately below the tin, a delivery-platform at one end of the conveyer, and a part extending from said platform across the path of the tins and adapted to enter said spaces for removing the tins and guiding the same to said platform, substantially as described.

7. In a pie-machine, the combination of a pair of endless link belts, sheaves supporting said belts in parallel relation to each other, a plurality of brackets connecting corresponding links of said belts, a shaft extending through each of said brackets at right angles to the plane of the adjacent links of said belts, and being longitudinally slidable therein, heads on said shafts for supporting pie-tins, springs normally holding said shafts in a retracted position, and mechanism for shifting said shafts to an extended position when they arrive at a certain point in the path of the conveyer, substantially as described.

8. In a pie-machine, the combination of a frame, a support for pie-tins mounted in said frame and vertically movable therein, a member mounted to rotate on a vertical axis above and in alinement with said support, a plurality of shafts journaled in said member and symmetrically arranged about said axis; friction-rollers secured to the upper ends of said shafts, trimming-rollers secured to the lower ends of said shafts, a fixed cone mounted in axial alinement with said member and adapted to coact with said friction-rollers to impart a planetary motion to said trimming-rollers, and means for raising said support to move a pie-tin into contact with said trimming-rollers and thereby force the friction-rollers into driving contact with the fixed cone, substantially as described.

9. In a pie-machine, the combination of a frame, a vertically-disposed depending stud secured to said frame, a pulley loosely journaled on said stud, a plurality of vertically-disposed shafts journaled on said pulley in symmetrical relation to said stud, friction-rollers secured to the upper ends of said shafts, trimming-rollers secured to the lower ends of said shafts, a support for pie-tins mounted below said pulley, said support being vertically movable in axial alinement with said pulley and adapted to carry a tin into contact with said trimming-rollers, substantially as described.

10. In a pie-machine, the combination of a frame, a vertically-disposed depending stud secured to said frame, a pulley loosely journaled on said stud, a plurality of vertically-disposed shafts journaled on said pulley in symmetrical relation to said stud, trimming-rollers secured to the lower ends of said shafts, mechanism for imparting a planetary motion to said shafts through the rotation of said pulley, a support for pie-tins mounted below said pulley, said support being vertically movable in axial alinement with said pulley and adapted to carry a tin into contact with said trimming-rollers, substantially as described.

11. In a pie-machine, the combination of a frame; a crust-trimming device mounted in said frame; a conveyer adapted to carry a plurality of pie-tins and to deliver the same in succession to said trimming device; power-driven mechanism for moving the pie-tins out of their normal path of travel along the conveyer and into contact with said trimming device; and a yielding connection forming part of said mechanism and adapted to limit the pressure between the pie-tins and trimming device, substantially as described.

Signed at Chicago this 14th day of December, 1904.

OLIVER COLBORNE
FRED DEUERLING.

Witnesses:
    EUGENE A. RUMMLER,
    GLEN C. STEPHENS.